United States Patent Office 3,473,998
Patented Oct. 21, 1969

3,473,998
SULFOBETAINE MONOMERS, POLYMERS THEREOF AND COMPOSITE FILAMENTS PREPARED FROM SAID POLYMERS
David Richard Spriestersbach, Wilmington, Del.; Ray Allen Clarke, 372 E. Holly Ave., Pitman, N.J. 08071; Monroe Couper, 1925 Cherokee Road, Waynesboro, Va. 22980; and Hugh T. Patterson, 1003 E. Rock Spring Road, Greenville, N.C. 27834; said Spriestersbach assignor to E. I. du Pont de Nemours and Company, Wilmington, Del., a corporation of Delaware
No Drawing. Filed Aug. 7, 1963, Ser. No. 300,622
Int. Cl. D01d 5/28; D01f 7/02
U.S. Cl. 161—177                    12 Claims

ABSTRACT OF THE DISCLOSURE

Polymerizable sulfobetaine monomers selected from the group consisting of acrylate, vinyl pyridine and styrene vinyl monomers. The monomers are polymerizable with acrylonitrile and are hydrophilic while exhibiting ionic neutrality. They are particularly suited for use as the hydrophilic component of reversibly crimpable multicomponent fibers in that dyeability is controlled independently of hydrophilicity requirements.

---

This invention relates to a new class of polymerizable vinyl monomers and polymers prepared from said vinyl monomers. More particularly, the invention relates to synthetic polymers comprised of acrylonitrile and sulfobetaine vinyl monomers.

In the preparation of polymeric products, it is often desirable to obtain a polymer which is truly neutral insofar as acidic or basic properties are concerned. Such polymers are particularly desirable for use with other polymers which have a known acidic or basic function in preparing multi-component filamentary structures. These so-called composite filaments which are comprised of two or more polymeric components in intimate adhering contact throughout the length of the filament, develop crimp when heated due to a differential shrinkage of the components. In some cases the crimp which is developed is reversible upon treatment with and removal of a swelling agent such as water due to the difference in hydrophilicity of the components. Acrylonitrile polymer filaments which exhibit crimp reversibility due to a differential in hydrophilicity provided by a controlled cationic or anionic monomer content in the components are described in U.S. Patent 3,038,237. Unfortunately some of the most satisfactory cationic or anionic monomers which are useful in the preparation of the aforementioned composite filaments also confer a significant degree of acidic or basic dyeability to the polymer so that incorporation of amounts of monomer required to provide good crimp reversibility may lead to a higher dyeability than can be conventionally accommodated in commercial dyeing processes and to problems in control of finished fabric dimensions which vary with dye depth as crimp is impaired by blocking of the hydrophilic sites by the dye.

It is, therefore, an object of this invention to provide a new class of vinyl monomers. It is another object of this invention to provide acrylonitrile polymers containing the new vinyl monomers which are useful in preparing composite filaments. A more specific object of the invention is to provide acrylonitrile polymers which supply the hydrophilicity required in one of the components of a composite filament to cause a differential in swelling and length change and thereby produce crimp reversibility. It is a further object of this invention to provide composite filaments which exhibit excellent crimp reversibility and can be dyed by conventional dyeing processes with size control independent of dye shade.

The aforementioned and other objects are attained by the preparation of a polymerizable sulfobetaine vinyl monomer selected from the group of vinyl monomers having the formula:

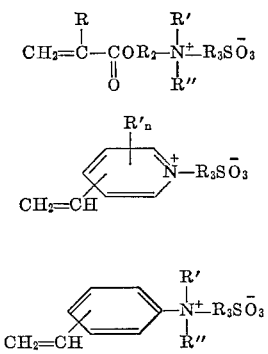

wherein $n$ is a cardinal number from 1 to 2, R is selected from the group consisting of hydrogen, alkyl radicals of 1 to 3 carbon atoms, phenyl and cyclohexyl, R' and R" are alkyl radicals from 1 to 2 carbon atoms, and $R_2$ and $R_3$ are saturated aliphatic hydrocarbon radicals of from 2 to 6 carbon atoms. The synthetic polymers provided by this invention contain from about 0.1% to about 20% by weight of the sulfobetaine vinyl monomer in copolymerized form. The remaining portion of the polymer may be acrylonitrile alone or may include small amounts, i.e. from about 2 to about 14% of a non-ionic copolymerizable ethylenically unsaturated monomer and from about 0.1 to 10% preferably 0.3% to 6%, of a copolymerizable ethylenically unsaturated sulfonic acid or its alkali metal salt. The polymers containing the sulfobetaine monomers function in a manner similar to the ionic monomers of the prior art in developing crimp reversibility in composite filaments, but the strong basic group and the strong acidic group of the sulfobetaine monomers provide internal neutralization. As a result neither group acts as a cationic or anionic acceptor and hence neither accepts basic or acid dyes. Thus, while prior art composite filaments tend to lose some of their crimpability due to the loss of cationic or anionic sites which become occupied during dyeing, the polymers of the present invention do not suffer from this effect. Dye sites may be supplied in the polymers of this invention by including small amounts of other polymerizable monomers without affecting the crimping characteristics.

The sulfobetaine monomers used in preparing the polymers of this invention are readily prepared by reacting a tertiary amine containing a vinyl group with a sultone. The reaction may be carried out in an inert solvent for the two compounds. The reaction readily proceeds at temperatures in the range from about −20° C. to about 60° C. and is preferably carried out at a temperature from 20° C. to 30° C. The sulfobetaines produced are isolated from the solvent in crystalline form. Polymerization of the acrylonitrile and the sulfobetaine may be carried out by using a conventional redox polymerization system.

The invention will be further illustrated but is not intended to be limited by the following examples in which parts and percentages are by weight unless otherwise indicated. In the examples, by the expression milliequivalents per kilogram (meq./kg.) of combined sulfonate and sulfate groups is meant the number of milliliters of one normal alkali which would be required to neutralize the combined anionic residues in one kilogram of polymer if all were in the free acid form.

Examples I, II and III which follow describe the preparation of typical sulfobetaine monomers which are useful in preparing the polymer of this invention.

Example I 2-methyl-5-vinylpyridine (119 g., 1 mole) was dissolved in dry acetone (500 ml.), and thereto was added 1,3-propanesultone (122 g., 1 mole). This reaction mixture was allowed to stand at room temperature for two hours. Poly-2-methyl-5-vinylpyridine which developed as a sludge was removed by decantation. The clear supernatant liquor was held at 40–50° C. overnight and the 3(2-methyl-5-vinyl-pyridinium)propanesulfonate which crystallized out was isolated by filtration, washed with acetone and dried. The yield was 60% of theoretical.

Example II 4-vinylpyridine (10.5 g., 0.1 mole) was dissolved in dry acetone (200 ml.) and 1,3-propanesultone (12.2 g., 0.1 mole) added. The reaction mixture was allowed to stand for 48 hours at room temperature and then heated for six hours under reflux. 3(4 - vinylpyridinium)propanesulfonate was crystallized from the reaction solution at room temperature, washed with acetone and dried. The yield approached 40%.

Example III

Dimethylaminoethyl methacrylate (314 g., 2 moles) was dissolved in dry acetone (3500 ml.) and 1,3-propane-sultone (244 g., 2 moles) added. The reaction mixture was allowed to stand at room temperature for one week. The crystalline product, 3[dimethyl(methacryloylethyl)ammonium]propane sulfonate, was isolated by filtration, washed with acetone and dried. The yield of 543 g. was 97.3% of theory.

Example IV

Examples IV through VI describe the preparation of acrylonitrile/sulfobetaine polymers. In each example the polymer was isolated by filtration, washed with water and dried. The inherent viscosity was measured at 25° C. using a 0.2 gm. per 100 ml. solution of polymer in pure dimethylformamide containing 0.02 molal lithium bromide.

Acryonitrile (910 g.) and 3[dimethyl(methacryloylethyl)ammonium]propane sulfonate (38 g.) were dissolved in water (13,000 ml.) and the pH adjusted to 3.5 with sulfuric acid. Ferrous ammonium sulfate (2 p.p.m. on total weight of solution) was then added and the reaction mixture heated to 50° C. while a stream of oxygen-free nitrogen gas was passed into the solution for fifteen minutes to free the solution of dissolved oxygen. Sodium metabisulfite (1.0% on weight of monomer) and potassium perdisulfate (0.4% on weight of monomer) were then added and the polymerizing mixture held at 50° C. in the absence of air for two hours. The white granular polymer which separated was isolated by filtration, washed with water and dried. The polymer had an intrinsic viscosity of 1.56 as measured on a dimethylformamide (DMF) solution at 25° C., and 73% of the monomer was converted to polymer. Infrared analysis showed the polymer contained 5.75% 3[dimethyl(methacryloylethyl)ammonium]propane sulfonate. Analysis showed 27 meq./kg. of combined sulfonate and sulfate end groups, derived from the redox initiator.

Example V

Using a stirred continuous reactor having a capacity of 1800 g. of reaction mixture, the following materials were metered into the reactor simultaneously to give a 21.1 percent feed of monomers based on the total feed. The pH of the reacting mass at "steady state" was maintained at 3.4.

| Reactant: | Rate of metering, ing, g./hr. |
|---|---|
| Acrylonitrile monomer | 360 |
| 3[dimethyl (methacryloylethyl) ammonium]propanesulfonate | 19.2 |
| Sodium styrenesulfonate | 1.54 |
| 0.096% aqueous solution of $K_2S_2O_8$ | 710 |
| 0.527% aqueous solution of $Na_2S_2O_5$ (containing sufficient ferrous ammonium sulfate to give 0.3 p.p.m. $Fe^{++}$, based on total feeds) | 710 |

The reactor was thermostated at 50° C. and a blanket of nitrogen maintained over the reactants by bleeding into the reactor a steady stream of the gas. At steady state conditions, the conversion of monomers to polymer was 73.5 percent. The polymer prepared in this manner had an intrinsic viscosity of 1.6 in DMF, and infrared analysis showed it to contain 5.3 percent 3[dimethyl(methacryloylethyl)ammonium]propanesulfonate. Analysis showed 48 meq./kg. of combined sulfonate and sulfate, about one-half of which was derived from the copolymerized sodium styrenesulfonate.

Example VI

A further continuous polymerization run was made exactly as in Example V except for the reactants and feed rates which were as follows:

| Reactant: | Rate of metering, ing, g./hr. |
|---|---|
| Acrylonitrile monomer | 360 |
| 3(2 - methyl - 5 - vinylpyridinium)propanesulfonate | 20.1 |
| Sodium styrenesulfonate | 1.54 |
| 0.117% aqueous solution of $K_2S_2O_8$ | 710 |
| 0.597% aqueous solution of $Na_2S_2O_5$ (containing sufficient ferrous ammonium sulfate to give 0.3 p.p.m. $Fe^{++}$, based on total feeds) | 710 |

The isolated polymer was found to have an intrinsic viscosity of 1.7 in DMF.

Filaments of textile denier could be prepared from the sulfobetaine containing polymers of the foregoing examples.

The remaining examples described the preparation of composite filaments.

Example VII

A 29% solution of the polymer of Example VI was prepared in dry DMF as solution A. A 21% solution of polyacrylonitrile of 2.0 intrinsic viscosity and containing 27 meq./kg. of sulfonate and sulfate end groups was prepared in dry DMF as solution B. Equivalent parts of the two solutions were dry-spun as composite filaments by separately metering through heat exchangers which heated them to 100° C. and extruding through a spinneret of the type described in U.S. Patent 3,006,028, which served to maintain separation of the solutions until they reached a point just above the individual orifices. The individual filaments were 9.2 d.p.f. and contained about 25% DMF. After drawing to 400% of their original length and washing in hot water to remove the residual DMF, they were mechanically crimped, cut to 3″ length and dried in circulating hot air on a perforated tray dryer. The resulting 3 d.p.f. staple, which at this stage contained only mechanical crimp, was processed on the standard cotton system to 20 c.c. yarns which were plyed to 10 c.c. and then circular-knitted to 8″ diameter tubing.

The tubing was cut into two parts of equal length. One-half was dyed as shown below. The other half was subjected to a mock dyeing in which all ingredients were present, except for the dyes.

For each 100 parts by weight of fabric to be dyed or mock dyed, 4000 parts by weight of an aqueous bath was prepared to contain the following:

0.5 part leveling agent composed of a non-ionic condensation product of ethylene and propylene oxide.

10.0 parts of Glauber's Salt (calculated as anhydrous Na₂SO₄).
3.0 parts "Sevron" Red GL. (CI Basic Red 18)
0.8 part Victoria Green small crystals. (CI Basic Green 4)
0.8 part "Sevron" Yellow R. (CI Basic Yellow 11)
0.5 part glacial acetic acid.
1.0 part retarder composed of a quaternary ammonium salt derived from naturally occurring fats.

The tubings were added to the cold baths which were raised to the boil at a rate of approximately 2° F. per minute. The baths were continuously boiled for an additional 1½ hours, cooled to 120° F. and the fabric removed. The fabrics were then rinsed with warm water, dried in a tumble dryer and examined. The mock-dyed fabric and the black-dyed fabric had equally excellent bulk and resilience. The two fabrics were of equal length and showed equally good crimp reversibility as evidenced by pronounced growth on wetting with water and shrinkage to their original shape and dimension when dried.

Example VIII

In this example a fabric prepared from prior art composite filaments is compared with a fabric prepared from filaments of the present invention.

Example VII was repeated except that solution A was replaced by a 27% solution of a copolymer of 96% acrylonitrile and 4% sodium styrenesulfonate, of 1.5 intrinsic viscosity, having 260 meq./kg. of combined sulfonate and sulfate substituents.

Results were generally in accord with those of Example VII, except that the black-dyed fabric had less bulk and resilience than the mock-dyed fabric. In addition, the black-dyed fabric was 5% longer than the mock-dyed fabric and although each fabric showed excellent crimp reversibility as evidenced by pronounced growth on wetting with water and shrinkage to their dried dimensions after dyeing, the 5% difference in length persisted.

Example IX

Example VII was repeated except that solution A was replaced by a 30% solution of the polymer of Example V. Results were equivalent to those of Example VII.

It will be apparent that in the foregoing examples dye receptivity depended on number of combined sulfonate and sulfate groups and was independent of the sulfobetaine contained in the fibers of Examples VII and IX.

Example X

Two knit fabrics prepared from fibers of Examples VII and VIII were dyed as follows: For each 100 parts by weight of fabric to be dyed 4000 parts by weight of an aqueous bath was prepared to contain the following:

0.25 part basic Blue Dye CI 21.
0.5 part glacial acetic acid.
10.0 parts Glauber's Salt.

The two tubings were added to separate boiling dye baths of the above composition.

The tubing of Example VIII exhausted the dye within less than 15 minutes and despite boiling for an additional hour had not dyed uniformly. The tubing of Example VII required 90 minutes to substantially exhaust all dye from the bath and had dyed uniformly and levelly.

In the practice of this invention, other sulfobetaines may be prepared as described in the foregoing examples. Among the sultones which may be used are 1,2-ethane sultone, 1,4-butane sultone, 4-methyl-1,4-butane sultone, 2-methyl-1,4-butane sultone, 2,2,3-trimethyl-1,3-propane sultone and the like. Included among the tertiary vinyl amines which may be reacted with the sultones to provide the sulfobetaine monomers are other vinylpyridines such as 4,6 - dimethyl-2-vinylpyridine, 4-ethyl-2-vinylpyridine, and 6-methyl-2-vinylpyridine. In addition to dimethylaminoethyl methacrylate, the alpha-ethyl, propyl, isopropyl, phenyl and cyclohexyl derivatives of acrylic acid in combination with the ethyl, propyl, isopropyl, butyl, amyl and hexyl esters may be used. The N,N-dimethyl aminostyrenes as well as the diethyl and methylethyl styrenes may also be used. Combination of the aforementioned reactants provide sulfobetaines which are internally neutral and are hygroscopic.

As mentioned previously, the sulfobetaines may be copolymerized with acrylonitrile and minor proportions of other copolymerizable ethylenically unsaturated monomers by using a conventional redox initiator system. In the redox system, ammonium and alkali salt of perboric acid, hydrogen peroxide, peracetic acid, urea-peroxide, perdisulfuric acid and the like may be used. Other oxygen-containing sulfur compounds such as sulfur dioxide, sodium hydrosulfite, sodium thiosulfate, sodium sulfite, and disodium sulfite may be substituted for the sodium metabisulfite. In a preferred process, an aqueous solution containing from about 0.1% to about 4% of potassium persulfate and about 0.05% to about 2% of sodium metabisulfite is used. A trace amount of an ionizable heavy metal salt, e.g., ferric chloride, ferric bromide, ferric nitrate, ferric sulfate, certain chromium and copper salts, etc., may be included in the reaction mixture. However, in a normal water supply this is generally not required.

The preferred polymers of this invention contain at least 85% polymerized acrylonitrile and from about 0.1% to about 15% by weight of the sulfobetaine vinyl monomer. Additional copolymerizable ethylenically unsaturated monomers such as those described in U.S. Patents 2,436,926 and 2,743,994 may be included. Among the monomers disclosed in the just-mentioned patents are vinyl acetate, methyl vinyl ketone, methyl-methacrylate, dimethyl itaconate, diethyl maleate, methacrylonitrile, styrene, vinyl chloride, butadiene, vinyl fluoride and N-vinyl phthalimide. Other monomers include ethylenically unsaturated sulfonic acids and their salts such as allyl oxyethyl sulfonic acid, allyl thiopropanolsulfonic acid, vinyl dichlorobenzenesulfonic acids, methyl styrenesulfonic acid as well as other sulfonic and sulfinic acids. The aforementioned as well as other copolymerizable sulfur-containing monomers are well known in the art and are described in U.S. Patents 2,527,300, 2,837,500 and 2,837,501. Among the particularly desirable monomers are the vinyl arene sulfonic acids and their water-soluble salts which are disclosed in the latter two patents.

Polymers prepared according to the procedure described in the examples have an average molecular weight in the fiber-forming range, i.e., from about 40,000 to 150,000 or more. These polymers may be spun into filaments using conventional procedures. The filaments may be used in applications where an hygroscopic yarn or fabric is desired. Particularly useful products are obtained when the polymers of this invention are cospun with other acrylonitrile polymers to provide composite filaments. The spinning techniques used may be those described in U.S. 3,038,237 or any number of other patents which describe the preparation of composite filaments. The composite filaments which exhibit reversible crimping characteristics are particularly useful in preparing bulky fabrics such as sweaters. In addition to the advantages of the products of this invention which have been set forth, other advantages and uses will be apparent from the foregoing description of the invention.

We claim:
1. A synthetic polymer comprised of acrylonitrile and a polymerizable sulfobetaine monomer selected from the group consisting of vinyl monomers having the formula:

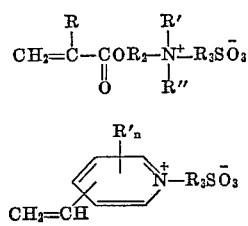

and

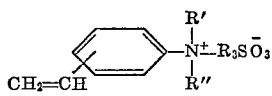

wherein $n$ is a cardinal number from 1 to 2, R is selected from the group consisting of hydrogen, alkyl radicals of 1 to 3 carbon atoms, phenyl and cyclohexyl, R' and R" are alkyl radicals having from 1 to 2 carbon atoms, and $R_2$ and $R_3$ are each a saturated aliphatic hydrocarbon radical of from 2 to 6 carbon atoms, said synthetic polymer containing from about 0.1% to about 20% by weight of said sulfobetaine vinyl monomer in copolymerized form with said acrylonitrile.

2. The polymer of claim 1 wherein from about 2% to 14% of a non-ionic copolymerizable ethylenically unsaturated monomer and from about 0.3% to 6% of a water-soluble alkali metal salt of a vinylarenesulfonic acid are copolymerized in said polymer.

3. The polymer of claim 1 wherein said sulfobetaine is a vinylpyridinium propanesulfonate.

4. The polymer of claim 1 wherein said sulfobetaine is 3[dimethyl (methacryloylethyl) ammonium] propanesulfonate.

5. The polymer of claim 1 in filament form.

6. A polymerizable vinyl monomer selected from the group consisting of vinyl monomers having the formula:

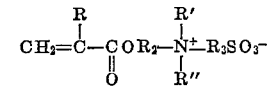

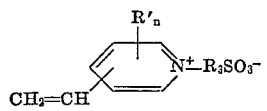

and

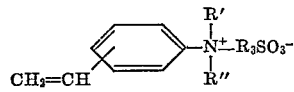

wherein $n$ is a cardinal number from 1 to 2, R is selected from the group consisting of hydrogen, alkyl radicals of 1 to 3 carbon atoms, phenyl and cyclohexyl, R' and R" are alkyl radicals having from 1 to 2 carbon atoms and $R_2$ and $R_3$ are each a saturated aliphatic hydrocarbon radical of from 2 to 6 carbon atoms.

7. The monomer of claim 6 wherein R, R' and R" are methyl radicals, $R_2$ is an ethylene radical, and $R_3$ is a propylene radical.

8. 3(2-methyl-5-vinylpyridinium) propanesulfonate.

9. 3[dimethyl(methacryloylethylammonium] propane sulfonate.

10. A composite filament comprised of at least two polymeric components in intimate adhering contact along the length of said filament, one of said components being a polymer of claim 1 and the other component being an acrylonitrile polymer containing at least 85% acrylonitrile, the remainder being copolymerized monomer selected from the group consisting of from 2% to 14% of a non-ionic ethylenically unsaturated monomer and from 0.3% to 6% of a water-soluble alkali metal salt of a vinylarenesulfonic acid.

11. A compound of the formula:

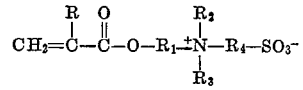

wherein R is selected from the group consisting of hydrogen and alkyl radicals of 1 to 3 carbon atoms, $R_1$ and $R_4$ are selected from the group consisting of alkyl radicals of 2 to 6 carbon atoms, at least two of which extend in a chain between the quaternary nitrogen atom and the adjoined radical, and $R_2$ and $R_3$ are selected from the group consisting of alkyl radicals of 1 to 2 carbon atoms.

12. A solid addition polymer polymerizable through the ethylenically unsaturated bonds of a compound of the formula:

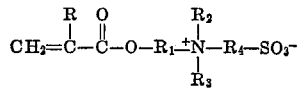

wherein R is selected from the group consisting of hydrogen and alkyl radicals of 1 to 3 carbon atoms, $R_1$ and $R_4$ are selected from the group consisting of alkyl radicals of 2 to 6 carbon atoms, at least two of which extend in a chain between the quaternary nitrogen and the adjoined radical, and $R_2$ and $R_3$ are selected from the group consisting of alkyl radicals of 1 to 2 carbon atoms.

References Cited

UNITED STATES PATENTS 2,794,015  5/1957  Jackson et al. _____ 260—85.5
2,810,713  10/1957  Melamed _____ 260—80.5

JAMES A. SEIDLECK, Primary Examiner

U.S. Cl. X.R.

260—501.12, 294.8, 486, 79.3; 161—173; 264—182, 171